(12) United States Patent
Kawamura et al.

(10) Patent No.: US 8,709,173 B2
(45) Date of Patent: Apr. 29, 2014

(54) THRUST BEARING COMPONENT

(75) Inventors: Tomoaki Kawamura, Iwata (JP);
Yasuyuki Watanabe, Iwata (JP);
Kousuke Obayashi, Fukuroi (JP)

(73) Assignee: NTN Corporation, Osaka (JP)

( * ) Notice: Subject to any disclaimer, the term of this patent is extended or adjusted under 35 U.S.C. 154(b) by 260 days.

(21) Appl. No.: 13/195,943

(22) Filed: Aug. 2, 2011

(65) Prior Publication Data

US 2011/0280508 A1 Nov. 17, 2011

Related U.S. Application Data

(63) Continuation of application No. 11/882,772, filed on Aug. 6, 2007, now abandoned.

(30) Foreign Application Priority Data

Aug. 10, 2006 (JP) .................................. 2006-218342

(51) Int. Cl.
*C23C 8/26* (2006.01)
*C22C 38/00* (2006.01)
*F16N 1/00* (2006.01)

(52) U.S. Cl.
USPC ............................ 148/318; 148/333; 384/618

(58) Field of Classification Search
USPC .................... 148/318, 320, 333; 420/99, 100; 384/618
See application file for complete search history.

(56) References Cited

U.S. PATENT DOCUMENTS

| | | | | |
|---|---|---|---|---|
| 5,064,298 A | * | 11/1991 | Hibi et al. ..................... | 384/625 |
| 6,051,082 A | * | 4/2000 | Okita et al. ................... | 148/333 |
| 2005/0018940 A1 | * | 1/2005 | Obayashi ...................... | 384/623 |

FOREIGN PATENT DOCUMENTS

| | | |
|---|---|---|
| JP | 9-87805 | 3/1997 |
| JP | 11-223225 | 8/1999 |
| JP | 2002-303329 | 10/2002 |
| JP | 2002-327238 | 11/2002 |
| JP | 2003-247555 | 9/2003 |

* cited by examiner

*Primary Examiner* — Roy King
*Assistant Examiner* — Caitlin Kiechle
(74) *Attorney, Agent, or Firm* — Clark & Brody

(57) ABSTRACT

A thrust bearing component is formed of cold-reduced steel sheets and strip having surface roughness of Rmax≤2 μm and provided by cold rolling a high-carbon steel containing 0.9 wt % to 1.2 wt % of carbon, 1.2 wt % to 1.7 wt % of chrome, 0.1 wt % to 0.5 wt % of manganese, and 0.15 wt % to 0.35 wt % of silicon.

2 Claims, 5 Drawing Sheets

THRUST BEARING COMPONENT

This is a continuation application of application Ser. No. 11/882,772, filed on Aug. 6, 2007, now abandoned.

BACKGROUND OF THE INVENTION

1. Field of the Invention

The present invention relates to a thrust bearing component such as a bearing washer of a thrust rolling bearing or a thrust sliding bearing, and a bearing washer of a thrust receiving mechanism.

2. Description of the Background Art

A high mechanical property and high processing accuracy are required for a bearing washer of a thrust rolling bearing or a thrust sliding bearing, and a bearing washer of a thrust receiving mechanism (referred to as the "thrust bearing component" collectively hereinafter). Therefore, when the thrust bearing component is manufactured, it is essential to select an appropriate starting material and an optimal processing method appropriate for the material.

For example, a manufacturing method of a synchronizer ring whose structure is similar to that of the thrust bearing component is disclosed in Japanese Unexamined Patent Publication No. 11-223225. The manufacturing method of the synchronizer ring disclosed in the above document will be described with reference to FIG. 6.

First, the synchronizer ring disclosed in the above document uses a steel plate provided by hot rolling a carbon steel containing 0.6 wt % to 1.2 wt % of carbon (C), 0.1 wt % to 0.9 wt % of manganese (Mn), 0.3 wt % to 1.0 wt % of chrome (Cr), and 0.01 wt % to 0.15 wt % of silicon, as a starting material.

Thus, it is disclosed that the synchronizer ring is manufactured through a step of forming the above starting material into a predetermined shape by a pressing process, a step of providing a predetermined dimension by a machining process such as a turning process, a step of providing predetermined hardness by a heat treatment including quenching and tempering, and a step of smoothing the surface by a grinding process as a finishing process.

Recently, the environment in which the thrust bearing is used has become increasingly harsh, and accordingly it is required that the mechanical property of the thrust bearing washer is to be further improved. Meanwhile, as price reduction of the thrust bearing is required, the manufacturing process needs to be simplified without changing its quality.

SUMMARY OF THE INVENTION

It is an object of the present invention to provide a thrust bearing component whose manufacturing cost is lowered by simplifying a manufacturing process and mechanical property is further improved.

A thrust bearing component according to the present invention is formed of a cold-reduced steel sheets and strip having surface roughness of Rmax≤2 μm and provided by cold rolling a high-carbon steel containing 0.9 wt % to 1.2 wt % of carbon (C), 1.2 wt % to 1.7 wt % of chrome (Cr), 0.1 wt % to 0.5 wt % of manganese (Mn), and 0.15 wt % to 0.35 wt % of silicon (Si).

Preferably, the thrust bearing component is manufactured by a step of forming the cold-reduced steel sheets and strip into a predetermined shape by a pressing process, a step of performing a heat treatment including a carbonitriding process and a high-temperature tempering process, and a step of removing a scale generated on its surface.

When the carbon steel having the above chemical components is used, the mechanical property of the thrust bearing component is improved. More specifically, a quenching property is improved, a rolling fatigue life and a load bearing property are improved, friction and wear are reduced, hardness is improved, and damage of the thrust bearing component due to the pressing process and the like can be prevented.

In addition, since the steel plate manufactured through the cold rolling process can provide desired dimension, surface smoothness, and hardness, a turning process for adjusting the dimension and a grinding process for smoothing the surface and the like can be omitted in the manufacturing process of the thrust bearing component. Thus, since the manufacturing process of the thrust bearing component can be simplified, the manufacturing cost of the thrust bearing component can be lowered.

According to the present invention, since the steel plate for the thrust bearing component provided by cold rolling the carbon steel having the predetermined chemical components is used as a starting material, the thrust bearing component can be low in cost and superior in mechanical property.

DESCRIPTION OF THE PREFERRED EMBODIMENTS

Figure 2:
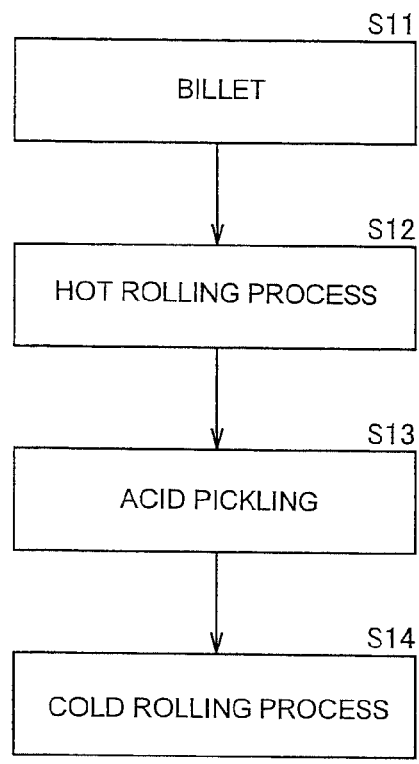
FIG. 2 is a flowchart showing main steps of the manufacturing process of a steel plate for a thrust bearing component.
Figure 3:
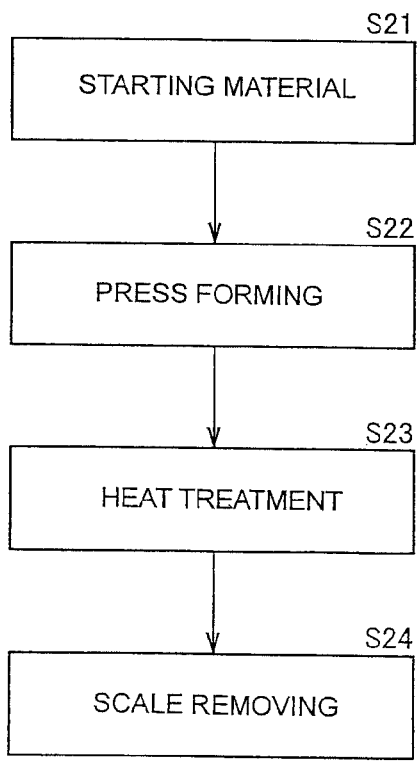
FIG. 3 is a flowchart showing main steps of the manufacturing process of a thrust bearing component from the steel plate for the thrust bearing component.

A thrust needle roller bearing 11 and a manufacturing method of bearing washers 12 and 13 of the thrust needle roller bearing 11 according to one embodiment of the present invention will be described with reference to FIGS. 1 to 3. In addition, FIG. 1 is a view showing the thrust needle roller bearing 11, FIG. 2 is a flowchart showing main manufacturing steps of a cold-reduced steel sheets and strip that is a starting material of a thrust bearing component, and FIG. 3 is a flowchart showing main manufacturing steps of the thrust bearing component.

Figure 1:
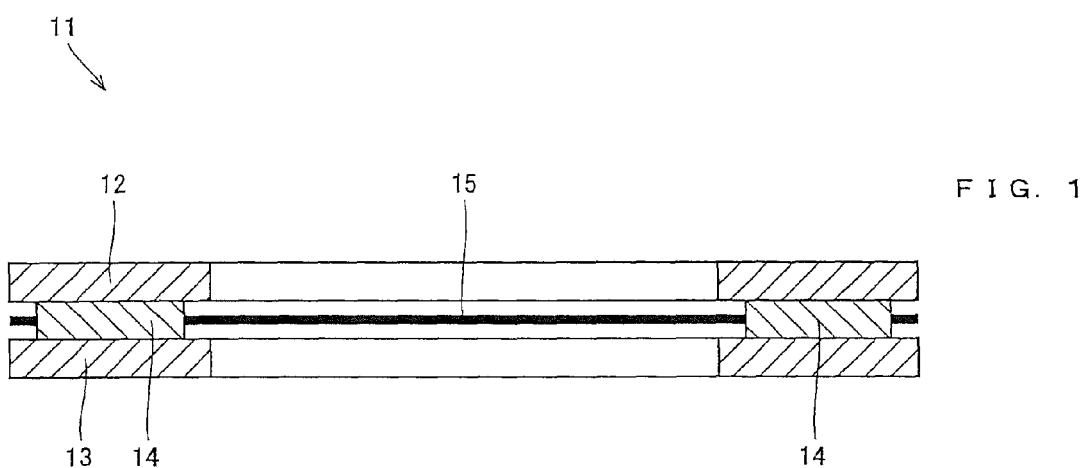
FIG. 1 is a view showing a thrust needle roller bearing according to one embodiment of the present invention.

First, referring to FIG. 1, the thrust needle roller bearing 11 comprises a pair of upper and lower bearing washers 12 and 13, a plurality of needle rollers 14 arranged between the pair of bearing washers 12 and 13 radially, and a retainer 15 retaining the interval of the adjacent needle rollers 14.

According to the above thrust needle roller bearing 11, although there are various advantages such that load capacity and rigidity can be high with a simple form, differential sliding is generated between the bearing washers 12 and 13 and the needle roller 14. According to the needle roller 14, pure rolling is provided in the center in its longitudinal direction and relative sliding is linearly increased toward both ends thereof. Especially, since the needle roller bearing 14 is long, the difference in peripheral speed at both ends of the needle roller 14 is large and a sliding amount is large as compared with other bearings.

Thus, since an wear amount of the bearing washers 12 and 13 is large at a part in which the differential sliding is largely generated, surface origin type peeling is generated at an rolling track edge. Especially, since the thrust needle roller bearing 11 have many rollers and narrow in internal space, lubricant oil is not likely to be spread on the track surface. As a result, the surface origin type peeling is easily generated as compared with the other bearings.

In addition, a high thrust load is applied to the bearing washers 12 and 13 in the thrust needle roller bearing 11 having the above constitution. Furthermore, predetermined hardness and surface smoothness are required for the track surface on which the needle roller 14 rolls.

Thus, a description will be made of a manufacturing method of the steel plate for the thrust bearing component that will be the starting material of the thrust bearing component to be used in the above environments with reference to FIG. 2. First, a billet containing 0.9 wt % to 1.2 wt % of carbon (C), 1.2 wt % to 1.7 wt % of chrome (Cr), 0.1 wt % to 0.5 wt % of manganese (Mn), 0.15 wt % to 0.35 wt % of silicon (Si), the remainder of inevitable impurities, and iron (Fe) is prepared as the starting material (S11). In addition, it is to be noted that the oxygen concentration in steel is not more than 0.0010%.

Carbon (C) is an essential element to ensure the strength required for the thrust bearing component. In addition, 0.9 wt % of carbon is needed to ensure the hardness of HRC58 or more on the surface and core part of the thrust bearing component. Meanwhile, when the carbon content exceeds 1.2 wt %, a large carbide is generated on the surface of the thrust bearing component, which lowers the rolling fatigue life and load bearing property and increases friction and wear. Thus, it is desirable the carbon content is within a range of 0.9 wt % to 1.2 wt %. In addition, the "HRC" designates Rockwell hardness.

In addition, chrome (Cr) is an essential element to improve the quenching property and rolling fatigue life of the thrust bearing component, ensure the hardness by the carbide, prevent the friction and wear, and improve the load bearing property. In addition, 1.2 wt % or more of chrome is needed to obtain the predetermined carbide. Meanwhile, even when an amount exceeding 1.7 wt % is added, its added effect is not provided so much. When it exceeds 5.0 wt %, a large carbide is generated, which lowers the rolling fatigue life and load bearing property and increases the friction and wear. Thus, it is desirable the chrome content is within a range of 1.2 wt % to 1.7 wt %.

In addition, manganese (Mn) is an element used for deoxidation when the steel is manufactured and it is an essential element as the starting material of the thrust bearing component. In addition, 0.1 wt % of manganese is needed to remove oxygen from the steel satisfactorily. Meanwhile, when more than 0.5 wt % of manganese is added, the material becomes fragile and the thrust bearing component could be damaged at the time of pressing. Thus, it is desirable that the manganese content is within a range of 0.1 wt % to 0.5 wt %.

In addition, silicon (Si) is an essential element in the steel material and the lower limit value of its content is 0.15%. Meanwhile, when it exceeds 0.35 wt %, the thrust bearing component could be damaged at the time of pressing. Thus, it is desirable that the silicon content is within a range of 0.15 wt % to 0.35 wt %.

In addition, since oxygen forms an oxide in steel, that becomes an origin of fatigue destruction as a nonmetal inclusion, it reduces the rolling fatigue life and load bearing property and increases the friction and wear. Thus, it is desirable that the oxygen concentration in steel is not more than 0.0010%.

Then, the steel plate is formed of the above material by hot rolling (S12). A large cast structure becomes a fine and preferable rolling texture through the hot rolling. In addition, since the work hardening of the material can be prevented by rolling at a temperature more than a recrystallization temperature, the thickness can be immediately reduced.

In addition, a step of annealing the rolled steel plate may be added after the hot pressing step. Since a crystal grain becomes fine and the direction of the crystal is adjusted by annealing, the accuracy and operability of the surface can be improved.

Then, acid pickling is performed in order to prevent rust and remove oxide layer (scale) attached on the surface of the steel plate (S13). The oxide layer shortens the life of a tool in a machining process and lowers production efficiency, and causes physical and chemical changes on the surface of the steel plate to lower the effect of the surface processing. Thus, as the oxide layer is removed through the acid pickling, production efficiency in the following steps and product quality can be improved. In addition, a pickling solution includes hydrochloric acid, sulfuric acid, nitric acid and the like, and 5% to 15% of dilute hydrochloric acid solution is used at 40° C. to 50° C. in many cases.

Then, the steel plate reaches a predetermined size and machinery properties such as hardness and surface smoothness and the like required for the thrust bearing component are provided by cool rolling (S14). A predetermined plate thickness can be accurately provided and uniform smoothness can be provided by rolling at a room temperature. In addition, since the steel plate is work-hardened by rolling at a temperature below the recrystallization temperature, the hardness of the steel plate is improved.

In addition, the surface roughness of the wall surface to become the track surface of the thrust bearing component is required to be Rmax≤1.6 μm in view of the smooth rolling of the needle roller 14. As will be described below, since barreling can be only preformed as far as a head of the surface roughness is removed after the shape of the thrust bearing component has been processed, it is desirable that the surface roughness after the cold rolling process is such that Rmax≤2 μm. Furthermore, in view of preventing the damage at the time of press forming, the hardness after the cold rolling process is preferably Hv220 or less. Here, the "Rmax" designates a maximum height and "Hv" designates Vickers hardness.

Here, the surface roughness, hardness and thickness of the steel plate provided by the cold rolling process are affected by the surface roughness of the rolling roll, the flexibility of the rolling roll, a rolling ratio (ratio of the thickness between after and before the rolling), the gap between the rolling rolls, a rotation speed and the like. Therefore, in order to provide the desirable surface roughness, hardness and plate thickness, it is necessary to set the above elements appropriately.

In addition, although the predetermined thicknesses may be provided by the above hot rolling process and the cold rolling process respectively, the predetermined thickness may be provided through a plurality of processes such as rough rolling, middle rolling and finish rolling.

When the billet comprising the above chemical components is processed by the above processes, the steel plate for the thrust bearing component (cold-reduced special steel sheets and strip) can provide very high mechanical property. Thus, in order to confirm the effect of the present invention, tensile strength, 0.2% proof stress, total elongation at rupture, work hardening coefficient (n value) and plastic strain ratio (r value) of the above steel plate for the thrust bearing component were measured. The measured result is shown in Table 1.

In addition, in Table 1, a minimum value, a maximum value and average value are shown with respect to each lot (No. 1 to No. 3).

TABLE 1

| Tensile strength | | | 0.2% proof stress | | | Total elongation at rupture | | | Work hardening coefficient | | | Plastic strain ratio | | |
|---|---|---|---|---|---|---|---|---|---|---|---|---|---|---|
| Minimum value | Maximum value | Average value | Minimum value | Maximum value | Average value | Minimum value | Maximum value | Average value | Minimum value | Maximum value | Average value | Minimum value | Maximum value | Average value |
| 560 | 622 | 589 | 388 | 458 | 428 | 28 | 32 | 30 | 0.15 | 0.16 | 0.16 | 0.96 | 1.48 | 1.26 |
| 572 | 628 | 596 | 364 | 452 | 406 | 27 | 31 | 29 | 0.15 | 0.16 | 0.16 | 0.94 | 1.46 | 1.22 |
| 586 | 638 | 607 | 394 | 462 | 434 | 26 | 30 | 28 | 0.15 | 0.16 | 0.15 | 0.92 | 1.52 | 1.21 |

Referring to Table 1, the tensile strength of the above steel plate was 550N/mm$^2$ or more. In addition, as the tensile strength and the 0.2% proof stress become high, the total elongation at rupture and the work hardening coefficient and the plastic strain ratio become low as will be described below. Since these values largely affect the workability of the steel plate, the material showing high values of those is not preferable for the material for manufacturing the thrust bearing component. Thus, although the maximum value of the tensile strength is 638/mm$^2$, and the maximum value of the 0.2% proof stress is 462N/mm$^2$ in Table 1, it is preferable the tensile strength is preferably approximately 550N/mm$^2$ and the 0.2% proof stress is preferably approximately 350N/mm$^2$.

In addition, the total elongation at rupture of the above steel plate was 25% to 35%. In addition, the work hardening coefficient was 0.12 to 0.18. Furthermore, the plastic strain ratio was 1.20 to 1.30. In addition, as the values of the total elongation at rupture, the work hardening coefficient and the plastic strain ratio are increased, the forming limit is improved, which is advantageous in manufacturing the thrust bearing component. However, according to the present invention, the values are set within the range described above in view of the relation with the tensile strength and the 0.2% proof stress.

In addition, the tensile strength, the 0.2% proof stress, and the total elongation at rupture were measured based on JIS (Japanese Industrial Standards) Z 2241. Similarly, the work hardening coefficient (n value) and the plastic strain ratio (r value) were measured based on JIS Z 2253 and JIS Z 2254, respectively.

Next, a description will be made of the manufacturing method of the thrust bearing component according to one embodiment of the present invention with reference to FIG. 3. In addition, FIG. 3 is a flowchart showing main manufacturing steps of the thrust bearing component. First, the steel plate (cold-reduced steel sheets and strip) for the thrust bearing component described with reference to FIG. 2 is employed as the starting material (S21).

Then, the steel plate is formed into the thrust bearing component by pressing (S22). According to the above starting material, since its thickness, surface roughness and the like are already in preferable conditions by the cold rolling process, the process such as a turning process may be omitted. As a result, since the manufacturing process can be simplified, the manufacturing cost of the thrust bearing component can be low. In addition, although the preferable configuration may be provided by the one pressing process, the preferable configuration may be provided through the plurality of pressing processes. In addition, a burring process may be performed after the pressing process.

Then, in order to provide the mechanical property required for the thrust bearing component, a heat treatment including a carbonitriding process and high-temperature tempering is performed (S23). In addition, a nitrogen enrichment layer is formed on the surface of the thrust bearing component by the carbonitriding process. This nitrogen enrichment layer is effective in improving the rolling fatigue life and load bearing property and in reducing the friction and wear.

In addition, not only the high temperature resistance characteristics are improved but also the residual austenite is split into tempered martensite and fine carbide by the high temperature tempering, which is effective in improving the rolling fatigue life and the load bearing property and in reducing the friction and wear under a high load condition, especially.

In addition, a tempering temperature needs to be 230° C. or more to keep the residual austenite below 5%. Meanwhile, when the tempering temperature is 280° C. or more, the hardness becomes HRC60 or less, which could not maintain the hardness required for the thrust bearing component. Thus, it is preferable that the tempering temperature is within a range of 230° C. to 280° C.

Finally, the oxide layer (scale) generated on the surface of the thrust bearing component during the heat treatment is removed (S24). The scale removing process includes a mechanical method such as a barreling process and blast cleaning or a chemical method such as acid pickling as described above.

Here, the "barreling process" is a process in which the thrust bearing component, a compound and a medium are put into a barrel and the barrel is rotated or vibrated. By this method, the scale can be removed and the thrust bearing component can be burred and the surface roughness can be improved. Since the surface roughness of the starting material of the thrust bearing component is already such that Rmax≤2 μm at the stage after the cold rolling process as described above, the surface roughness such that Rmax≤1.6 μm required for the thrust bearing component can be provided without an independent grinding process.

According to the present invention, when the carbon steel having the above chemical components is used, the various mechanical properties of the thrust bearing component are improved. As a result, the rolling fatigue life and load bearing property are improved and the friction and wear are reduced in the thrust bearing component.

In addition, when the cold rolling process is contained in the manufacturing process of the starting material (shown in FIG. 2), the thickness, hardness, surface roughness and the like required for the thrust bearing component can be provided. Thus, the turning process and the grinding process can be omitted in the manufacturing steps of the thrust bearing component (shown in FIG. 3). As a result, the manufacturing process of the thrust bearing component is simplified and the manufacturing cost of the thrust bearing component can be lowered.

In addition, although the description has been made of the manufacturing method of the bearing washers 12 and 13 of the thrust needle roller bearing 11 in the above embodiment, the present invention is not limited to this and the present invention can be applied to a manufacturing method of another thrust bearing component. For example, the present invention may be applied to a thrust rolling bearing in which a rolling element is a cylindrical roller or a ball, or a thrust sliding bearing having no rolling element. Thrust bearings according to other embodiments of the present invention will be described with reference to FIGS. 4 and 5. In each of FIGS. 4 and 5, an upper part is a perspective view and a lower part is a side sectional view.

Figure 4:
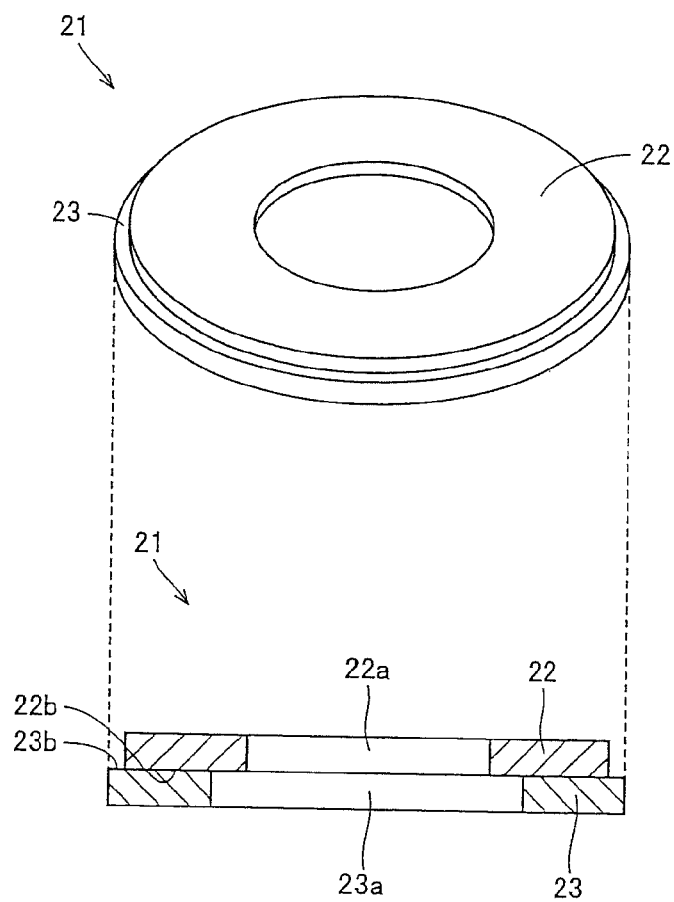
FIG. 4 is a view showing a thrust sliding bearing according to another embodiment of the present invention.

First, referring to FIG. 4, a thrust sliding bearing 21 according to another embodiment of the present invention comprises two bearing washers 22 and 23. The bearing washers 22 and 23 are disk-shaped members having holes 22a and 23a in the center, respectively and they overlap with each other so that their track surfaces 22b and 23b abut on each other.

According to the thrust sliding bearing 21, the bearing washer 22 is fixed to a rotation shaft (not shown) and the bearing washer 23 is fixed to a housing (not shown), for example. Since the bearing washer 22 rotates while slides on the bearing washer 23, the rotation shaft can be rotatably supported. In addition, it is to be noted that the above rotation shaft includes not only the one rotating in a certain direction but also the one that oscillates. In addition, it is to be noted that the bearing washer 23 includes the one that is fixed to another rotation shaft relatively rotating with the above rotation shaft.

Figure 5:
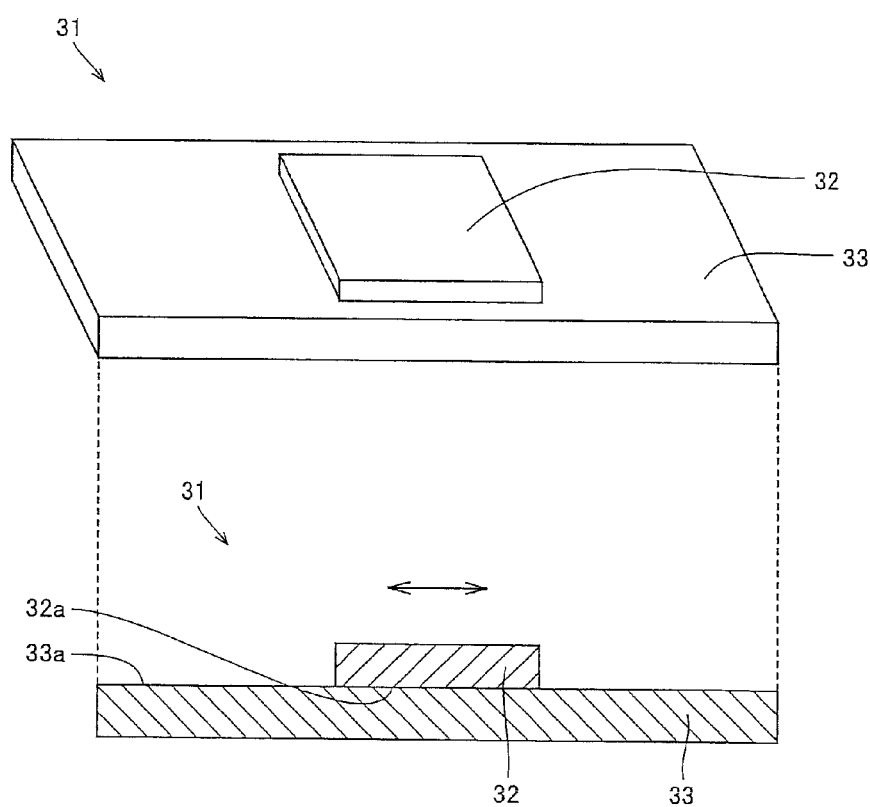
FIG. 5 is a view showing a thrust sliding bearing according to still another embodiment of the present invention.
Figure 6:
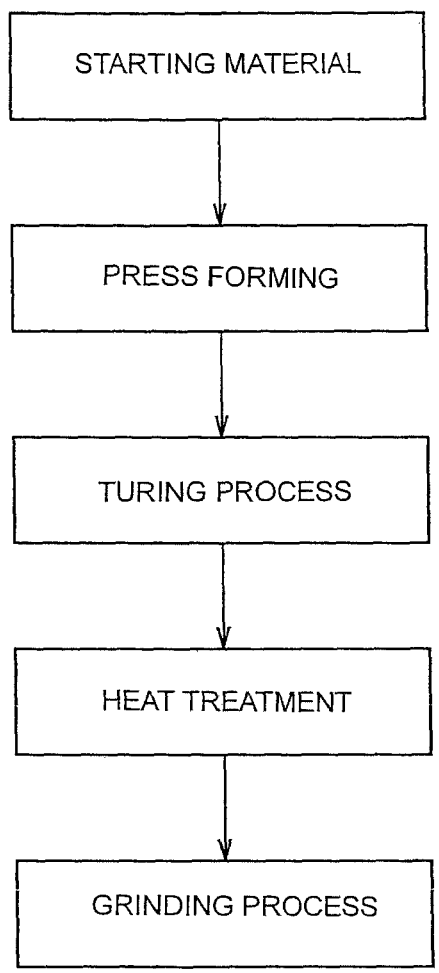
FIG. 6 is a flowchart showing main steps of the manufacturing process of a synchronizer ring.

Next, referring to FIG. 5, a thrust bearing component 31 according to still another embodiment of the present invention comprises two bearing washers 32 and 33. The bearing washers 32 and 33 are rectangular members and overlap with each other so that their track surfaces 32a and 33a abut on each other.

According to this thrust sliding bearing 31, the bearing washer 32 is fixed to a reciprocating member (not shown) and the bearing washer 33 is fixed to a housing (not shown), for example. Since the bearing washer 32 reciprocates (shown by an arrow in FIG. 5) while slides on the bearing washer 33, it can support the reciprocating member moving linearly within a certain range. In addition, it is to be noted that the bearing washer 33 includes the one that is fixed to another reciprocating member moving relatively with the above reciprocating member.

Large thrust load is applied to the bearing washers 22, 23, 32 and 33 in the thrust sliding bearing 21 and 31, and certain hardness and surface smoothness are required for the track surfaces 22b, 23b, 32b and 33a. Thus, when at least one of the bearing washers 22 and 23 of the thrust sliding bearing 21 and at least one of the bearing washers 32 and 33 of the thrust sliding bearing 31 are manufactured by the method shown in FIGS. 2 and 3, the effect of the present invention can be provided.

In addition, it is to be noted that the "thrust bearing component" in this specification includes not only the disk-shaped bearing washers 12, 13, 22, and 23 as shown in FIGS. 1 and 4 but also the rectangle-shaped bearing washers 32 and 33 as shown in FIG. 5.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

The present invention can be advantageously applied to manufacturing of the bearing washer and the like of the thrust rolling bearing or the thrust sliding bearing.

What is claimed is:

1. A thrust needle bearing having needle rollers, a retainer for retaining said rollers with a prescribed space and a washer for supporting the rollers, wherein the washer is formed by pressing and shaping cold-reduced steel sheets and strip to form a cold reduced washer, the washer having a surface roughness of Rmax≤2 μm, a hardness of Hv220 or less, a predetermined plate thickness, and provided by cold rolling a high-carbon steel containing 0.9 wt % to 1.2 wt % of carbon, 1.2 wt % to 1.7 wt % of chrome, 0.1 wt % to 0.5 wt % of manganese, and 0.15 wt % to 0.35 wt % of silicon, the washer having a nitrogen enrichment layer, wherein the forming of the washer by the pressing and shaping of the cold-reduced sheets and strip produces the surface roughness, the hardness, and predetermined plate thickness such that a dimension adjusting step and a surface smoothing step are not required for use of the washer in the thrust needle bearing.

2. The thrust needle bearing according to claim 1, wherein said washer is manufactured by the steps of a carbonitriding process forming the nitrogen enrichment layer, a heat treatment process including a high temperature tempering, and removing an oxide layer generated on a washer surface.

* * * * *